United States Patent
Taylor

(10) Patent No.: US 6,507,565 B1
(45) Date of Patent: Jan. 14, 2003

(54) METHOD AND SYSTEM FOR MANAGING REMOTE RESOURCES IN A TELECOMMUNICATIONS SYSTEM

(75) Inventor: Robert C. Taylor, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/309,719

(22) Filed: May 11, 1999

(51) Int. Cl.[7] ............................................... G01R 31/08
(52) U.S. Cl. ........................ 370/252; 370/242; 375/222
(58) Field of Search ................................ 370/242, 252; 375/224, 228, 231, 222; 709/223, 224, 226, 239; 714/47; 340/3.3, 3.31, 3.32, 3.43, 3.51, 825.02; 379/93.07

(56) References Cited

U.S. PATENT DOCUMENTS

| | | | |
|---|---|---|---|
| 4,489,416 A | * 12/1984 | Stuart .......................... | 375/222 |
| 4,761,646 A | * 8/1988 | Choquet et al. ........ | 340/825.52 |
| 4,819,235 A | * 4/1989 | Kelly et al. ................. | 375/222 |
| 5,210,530 A | 5/1993 | Kammerer et al. .... | 340/825.08 |
| 5,621,721 A | 4/1997 | Vatuone ........................ | 370/16 |
| 5,668,857 A | * 9/1997 | McHale .................... | 379/93.07 |
| 5,678,006 A | 10/1997 | Valizadeh et al. ...... | 395/200.02 |
| 5,999,565 A | * 12/1999 | Locklear et al. ............. | 375/222 |
| 6,128,656 A | * 10/2000 | Matchefts et al. ........... | 709/223 |
| 6,381,221 B1 | * 4/2002 | Legouet-Camus et al. .. | 370/252 |

* cited by examiner

Primary Examiner—Edwin C. Holloway, III
(74) Attorney, Agent, or Firm—Baker Botts L.L.P.

(57) ABSTRACT

A resource management station for a distributed system includes a managed resources store operable to store for each of a plurality of remote managed resources a previous value of a status of the remote managed resource and a previous value of a parameter indicative of status changes by the remote managed resource. A polling engine is operable to periodically poll each remote managed resource for a current value of the status and current value of the parameter. A resource manager is operable to determine whether a status change occurred in the remote managed resource by comparing the previous and current values of the status. The resource manager is further operable to determine whether an intermediate status change occurred by comparing the previous and current values of the parameter.

20 Claims, 3 Drawing Sheets

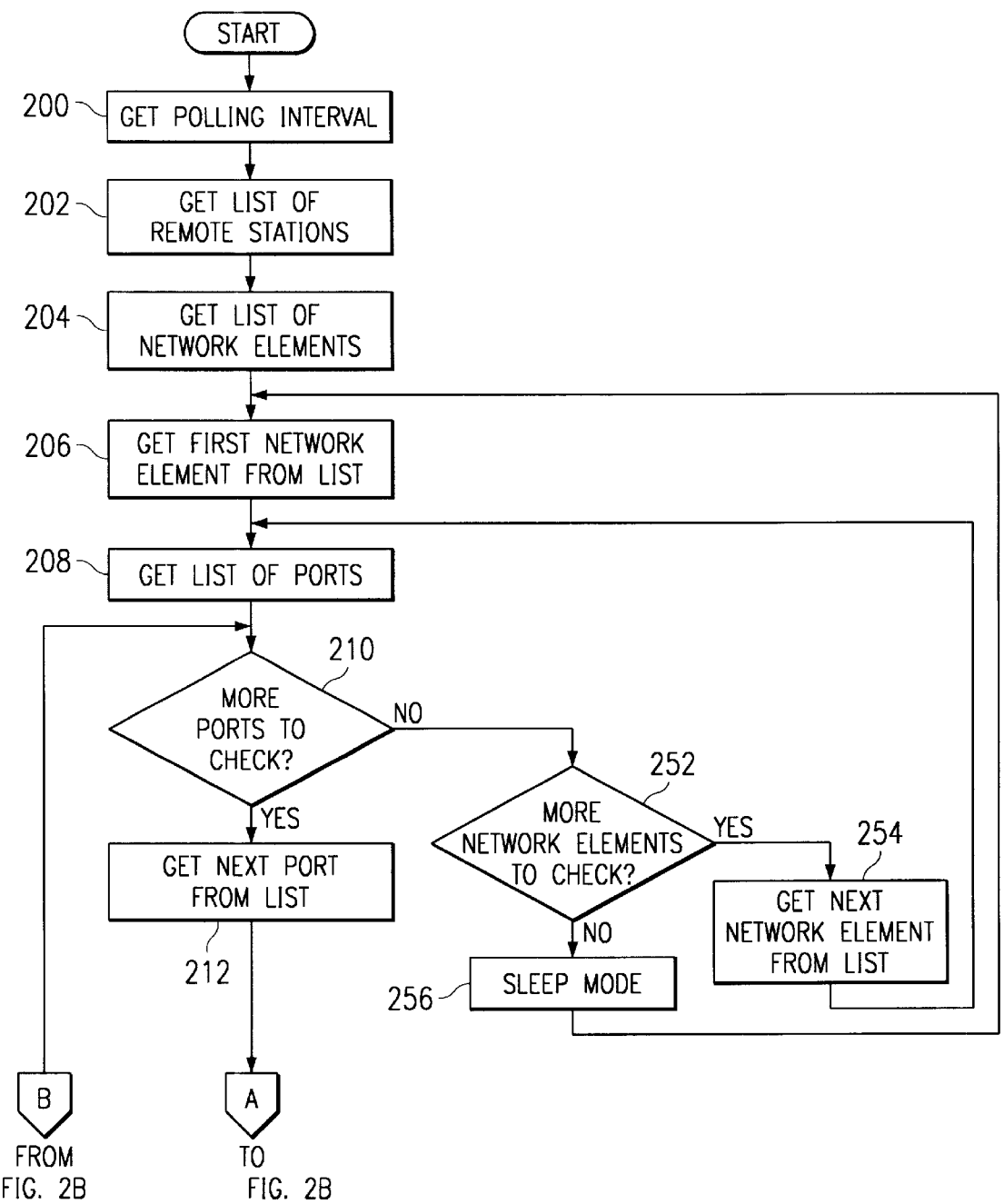

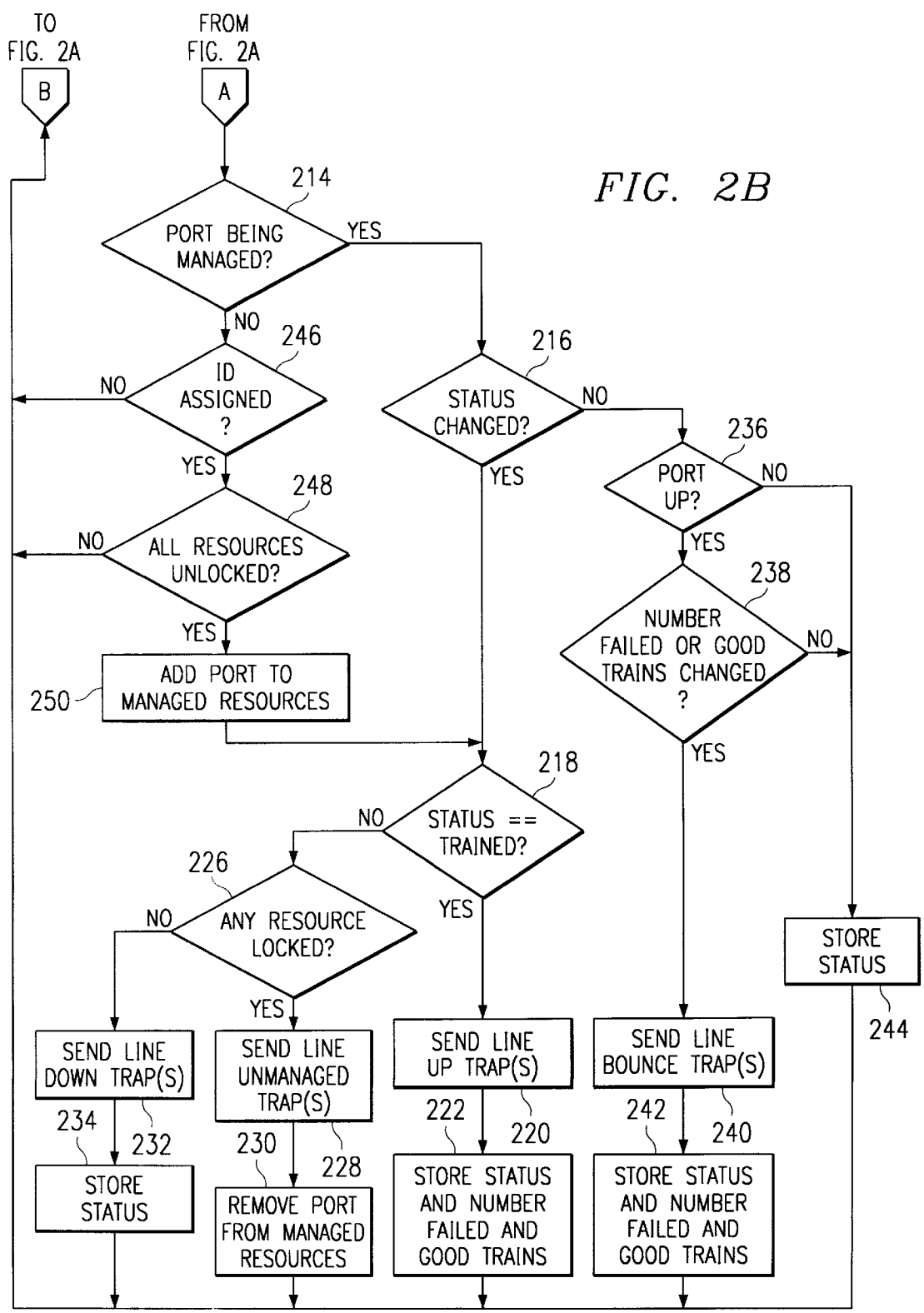

METHOD AND SYSTEM FOR MANAGING REMOTE RESOURCES IN A TELECOMMUNICATIONS SYSTEM

TECHNICAL FIELD OF THE INVENTION

This invention relates generally to telephony systems and more particularly to a method and system for managing remote resources in a telecommunications system.

BACKGROUND OF THE INVENTION

Telecommunications is a rapidly growing industry that affects almost every other major industry. Because of the field's rapid growth, the management of resources in telecommunications systems has become more difficult as the systems have become increasingly larger and more complex. In addition to the problems of monitoring any distributed network, modern telecommunications systems include resources that are incapable of autonomous notification, notifying the system that a disruption or failure has occurred without being prompted to provide the information. These resources must be monitored for operational and business-related reasons.

Traditional methods for monitoring these complex, distributed telecommunications systems periodically poll resources to determine whether a failure has occurred. Polling is preferably periodic to minimize bandwidth usage. A result of periodically polling, however, is that resources cannot be monitored with the desired accuracy. Thus, disruptions occurring between consecutive polls may go unnoticed.

SUMMARY OF THE INVENTION

In accordance with the present invention, a method and system for managing remote resources in a telecommunications system are provided that substantially eliminate or reduce the disadvantages or problems associated with previously developed methods and systems. In particular, the present invention identifies intermediate disruptions or failures in managed resources that occur between consecutive polls.

In one embodiment of the present invention, a resource management station is provided for a distributed system. The resource management station includes a managed resources store operable to store for each of a plurality of remote managed resources a previous value of a status of the remote managed resource and a previous value of a parameter indicative of status changes by the remote managed resource. A polling engine is operable to periodically poll each remote managed resource for a current value of the status and current value of the parameter. A resource manager is operable to determine whether a status change occurred in the remote managed resource by comparing the previous and current values of the status. The resource manager is further operable to determine whether an intermediate status change occurred by comparing the previous and current values of the parameter.

Technical advantages of the present invention include providing an improved resource management system and method for a telecommunications system. In particular, disruptions or failures in managed resources that occur between polls are identified, even in those situations in which a managed resource is in a same state at the times of the consecutive polls. This allows notification of such intermediate state changes to be provided to the appropriate systems. As a result, complete state information is available for resources that are unable to provide autonomous notification without the need for continuous polling. In addition, the ability to identify state changes between consecutive polls allows for longer intervals between polls without a corresponding decrease in accuracy of state information. Accordingly, bandwidth usage is minimized.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 2 is a flow diagram illustrating a method for managing the remote resources of the telecommunications system of FIG. 1 in accordance with one embodiment of the present invention.

DETAILED DESCRIPTION OF THE INVENTION

Figure 1:
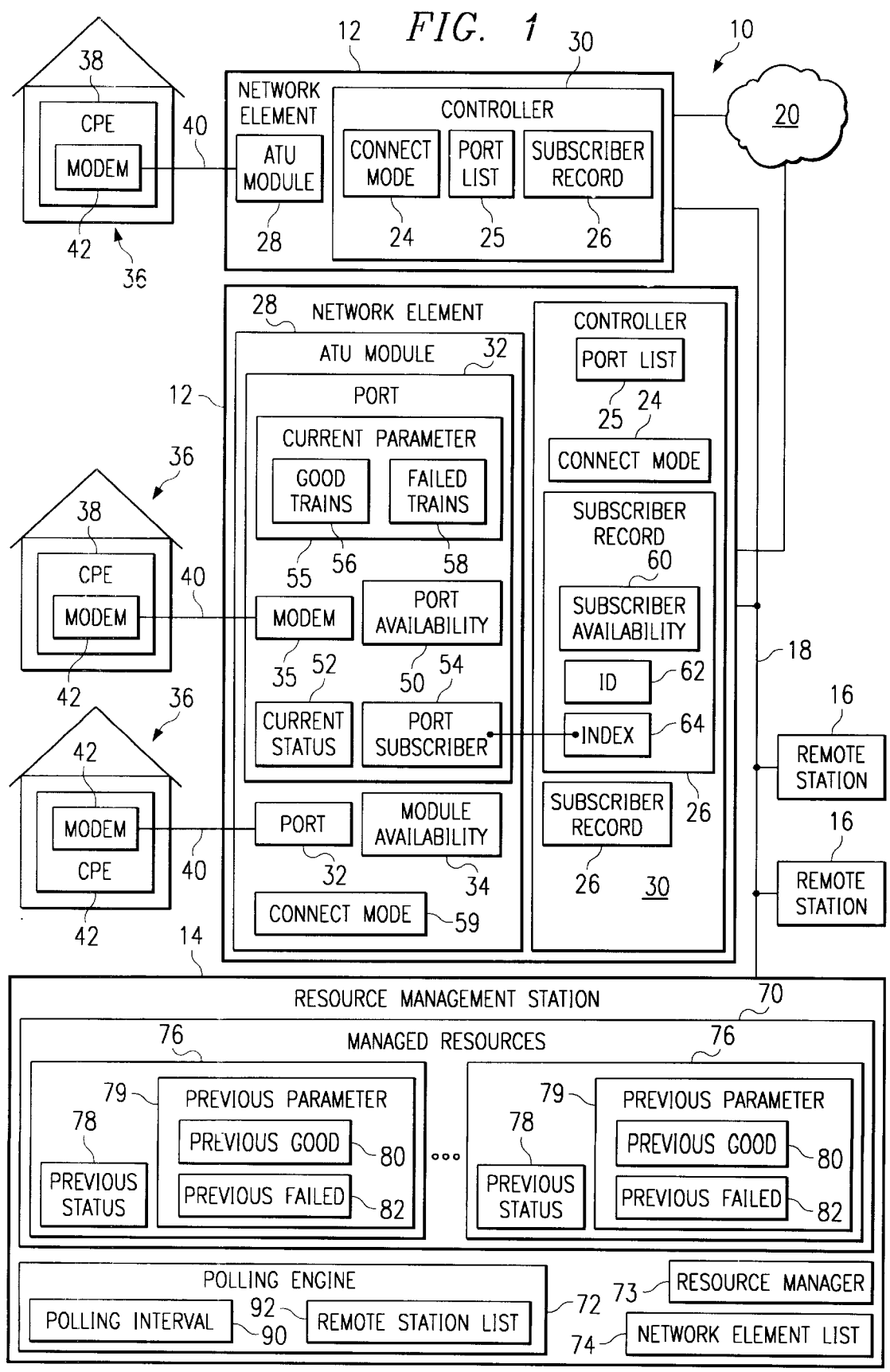
FIG. 1 is a block diagram illustrating a system for managing remote resources in a telecommunications system in accordance with one embodiment of the present invention.

FIG. 1 is a block diagram illustrating a telecommunication system 10 in accordance with one embodiment of the present invention. The telecommunication system 10 transmits voice, audio, video and/or other types of data from one point to another.

Referring to FIG. 1, the telecommunication system 10 comprises one or more network elements 12, a resource management station 14 and remote stations 16 interconnected by a network 18. The network elements 12, resource management station 14 and remote stations 16 each comprise a network interface that includes software and/or hardware for communicating over the network 18.

The network 18 transmits management, control and other data between the network elements 12, resource management station 14 and remote stations 16. The network 18 may include any interconnection found on any computer network such as a local area network, a wide area network, the Internet, or any other communications and data exchange systems created by connecting two or more computers. Accordingly, the network elements 12, resource management station 14 and remote stations 16 may connect and communicate with each other via modems, analog and/or digital communication lines.

The network element 12 is a switch router, access device or other device capable of receiving and transmitting traffic in the telecommunication system 10. According to one embodiment, the network element 12 is a Cisco 6100 Advanced Digital Subscriber Line Access Multiplexer (ADSLAM). The network element 12 may communicate with other network elements 12 over a publicly switched network 20. Similarly to the network 18, the publicly switched network 20 may comprise any interconnection found on any computer network such as a local area network, a wide area network, the Internet, or any other communications and data exchange systems created by connecting two or more computers.

The network element 12 comprises one or more resource modules 28 and a controller 30, as well as conventional switching fabric, transmission line output cards, and one or more connecting buses. The resource module 28 is a line card or other device including resources for processing network traffic, managing the system, and the like. As described in more detail below, the resource module 28 includes resources that are unable to provide autonomous notification of status or other operational changes. The status is the operation or other suitable state of a resource.

According to one embodiment, the resource module 28 is an asymmetric digital subscriber line transceiver unit (ATU) module. The ATU module 28 comprises at least one port 32 and a module availability indicator 34. For the embodiment in which the network element 12 is a Cisco 6100 ADSLAM, the ATU module 28 comprises two or more ports 32. The module availability indicator 34 defines the availability of the module 28 for use by the network element 12, as assigned administratively by an operator. According to one embodiment, the module availability indicator 34 indicates the administrative state of the module 28, which may be locked or unlocked. If the module 28 is locked, the module 28 has been placed out of service so that the network element 12 is prohibited from using the module 28. In addition, any resources dependent on that module 28 are, by definition, out of service. If the module 28 is unlocked, the module 28 is in service and the network element 12 is permitted to use the module 28 for normal operation.

Each port 32 includes a modem 35 that communicates with a customer system 36. The customer systems 36 each include customer premises equipment (CPE) 38 such as a telephone that is coupled to the network element 12 through a communication line 40, commonly referred to as a local loop circuit. The communication line 40 is a conventional twisted pair or other suitable cable. The CPE 38 includes a customer modem 42 that communicates with the modem 35 at the port 32. The modems 35 and 42 each convert digital data to analog form for transmission to each other and digitize received analog information. In this way, the port 32 and CPE 38 allow packet traffic on a conventional phone line. It will be understood that the network element 12 may otherwise communicate with CPE 38 or other suitable remote systems.

To support the modem 35, each port 32 comprises a port availability indicator 50, a current status indicator 52, a port subscriber value 54, and a current parameter field 55, which for modems includes a good trains value 56 and a failed trains value 58. The port availability indicator 50 defines the availability of the associated port 32 for use by the network element 12, as assigned administratively by an operator. According to one embodiment, the port availability indicator 50 indicates whether the port 32 is locked or unlocked. If the port 32 is locked, the port 32 has been placed out of service so that the ATU module 28 is prohibited from using the port 32. In addition, any resources dependent on that port 32 are, by definition, out of service. If the port 32 is unlocked, the port 32 is in service and the ATU module 28 is permitted to use the port 32 for normal operation.

The current status indicator 52 includes the physical layer communication status of the associated port 32. In accordance with one embodiment, the status of the port 32 may be trained, training, or not trained. If the status is trained, the port 32 is successfully connected and trained to a customer system 36 and is ready to pass data over a communication line 40. In this case, the port 32 is considered to be up. If the status is training, the port 32 is currently attempting to train with a customer system 36. If the status is not trained, the port 32 is not trained to a customer system 36 and is in an idle state. In these cases in which the status is training or not trained, the port 32 is considered to be down. Although the port 32 stores the status in the current status indicator 52, the port 32 is unable to provide autonomous notification of changes in status to remote stations 16. Therefore, as described in more detail below, the external resource management station 14 is used to retrieve status information from the port 32, to determine whether status changes have occurred and, if so, the number of status changes, and to communicate this information to remote stations 16.

The port subscriber value 54 identifies a subscriber record 26 that is associated with the port 32. According to one embodiment, the subscriber record 26 corresponds to a subscriber whose local loop circuit 40 is physically coupled to the associated port 32.

The good trains value 56 is a rolling counter that is incremented each time the port 32 successfully trains with a customer system 36. The failed trains value 58 is a rolling counter that is incremented each time the port 32 attempts but fails to train with a customer system 36. As described in more detail below, the good and failed trains form a parameter indicative of status changes by the port 32.

The controller 30 manages operation of the network element 12. The controller 30 includes a connect mode field 24, a port list 25 and a subscriber record 26 for each port 32. The connect mode field 24 indicates the connection mode for the network element 12. According to one embodiment, the connect mode field 24 indicates whether the network element 12 is in a direct-connect mode or a pooled mode. Each ATU module 28 will also have a connect mode field 59 that indicates whether that ATU module 28 may be inserted into a direct-connect or pooled network element 12. If the connect mode field 59 does not match the connect mode field 24, the network element 12 will issue a fault indication, and the ports 32 of that ATU module 28 will not be visible within the network element 12.

In the direct-connect mode, subscribers represented by subscriber records 26 are connected directly to modems, bypassing line interface modules, Digital Off-Hook circuitry, and the analog switching matrix. Therefore, in direct-connect mode, a one-to-one subscriber-to-modem ratio is in effect, and oversubscription and modem pooling are not possible. In a pooled mode, subscribers are connected through line interface modules to a pool of modems using Digital Off-Hook circuitry or other suitable connection. Thus, when the network element 12 is in a pooled mode, subscribers routinely connect to and disconnect from modems. Because of this, the telecommunication system 10 of the present invention is particularly important for the direct-connect mode in which disconnections indicate potential malfunctions. In an alternative embodiment, a network element 12 that is configured for pooled mode may also be managed with this process.

The port list 25 includes a list of the ports 32 in the ATU modules 28 for the associated network element 12. As described in more detail below, the resource management station 14 uses the port list 25 to identify ports 32 that may be polled for status and operational information.

The subscriber record 26 identifies a corresponding subscriber that is assigned to a particular port 32 for communication. The subscriber record 26 comprises a subscriber availability indicator 60, an identification value 62 and an index value 64. The subscriber availability indicator 60 defines whether or not the network element 12 will provide service to the associated subscriber, as assigned administratively by an operator. According to one embodiment, the subscriber availability indicator 60 indicates the administrative state of the subscriber, either locked or unlocked. If the subscriber is locked, the subscriber has been placed out of service so that the network element 12 is prohibited from providing service to the subscriber via the associated port 32. In addition any resources dependent on that subscriber are, by definition, out of service. If the subscriber is unlocked, the subscriber is in service and the network element 12 is permitted to provide service to the subscriber via the associated port 32 for normal operation.

The identification value 62 uniquely identifies the subscriber with an account number, a circuit identifier, or any other suitable identifier. The index value 64 identifies subscribers authorized to use the port 32. The index value 64 includes the same information as the associated port subscriber value 54 when, as described above, the network element 12 and the ATU module 28 are in a direct-connect mode. If the network element 12 or the ATU module 28 is not in a direct-connect mode or if no subscriber is associated with the port 32, a value of zero may be assigned to the port subscriber value 54.

The resource management station 14 manages resources of the telecommunication system 10. For resources that are unable to provide autonomous notification of status changes, the resource management station 14 polls the resources at specified intervals. The resource management station 14 stores, processes, and distributes information relating to those resources.

The resource management station 14 comprises a managed resources store 70, a polling engine 72, a resource manager 73 and a network element list 74. The managed resources store 70 includes a resource information field 76 for each remote managed resource. For the ATU module port 32, the resource information field 76 comprises a previous status indicator 78 and a previous parameter field 79, which for modems includes a previous good trains value 80 and a previous failed trains value 82. The previous status indicator 78 stores the previous status of the associated managed resource and is obtained from the current status indicator 52 of the port 32. The previous good trains value 80 stores the previous number of good trains for the associated managed resource, as stored in the good trains value 56 of the port 32 at the time of the previous poll. The previous failed trains value 82 stores the previous number of failed trains for the associated managed resource, as stored in the failed trains value 58 of the port 32 at the time of the previous poll. The data stored in the previous status indicator 78 and the previous parameter field 79 is updated after each poll once the resource management station 14 determines that the previously stored data is no longer needed.

The polling engine 72 comprises a polling interval 90 and a remote station list 92. The polling interval 90 indicates how often the polling engine 72 will communicate with the managed resources to obtain data regarding each managed resource's status and operational information. For the embodiment in which the network element 12 is a Cisco 6100 ADSLAM, the polling interval 90 may be 15 minutes. In an alternative embodiment, the polling engine 72 may also poll the managed resources, or a subset of the managed resources, in response to a command from the resource management station 14 before the polling interval 90 has passed. The remote station list 92 includes a list of each remote station 16 that is to receive notification regarding status changes in the managed resources.

In operation, the resource manager 73 compares the data in the resource information field 76 to the data in the current status indicator 52 and the current parameter field 55 in order to determine whether the status changed between polls. In certain situations, the resource manager 73 also uses the data to determine whether intermediate status changes occurred during the polling interval 90 and, if so, the number of such intermediate status changes. The network element list 74 includes a list of the network elements 12 that include resources that may be managed by the resource management station 14.

As described in more detail below in connection with FIG. 2, the resource management station 14 polls each remote managed resource to determine its status. If the status has changed from either not trained or training to trained, the resource management station 14 sends a "line up" notification to each of the remote stations 16 in the remote station list 92. According to an alternative embodiment, each managed resource may be associated with specified remote stations 16 in the list 92 so that only a portion of the remote stations 16 receive notification regarding the status of a particular managed resource. In addition to notifying remote stations 16, the resource management station 14 also stores the updated status and information indicative of the numbers of good and failed trains in the resource information field 76 for the managed resource.

If the status has changed from trained to either not trained or training, the resource management station 14 determines whether the resource was taken out of service intentionally by checking the availability of the module 28, the subscriber and the port 32. If the module availability 34, port availability 50 or subscriber availability 60 is locked, the resource management station 14 sends a "line unmanaged" notification to each of the remote stations 16 in the remote station list 92 or, in the alternative embodiment, to each of the specified remote stations 16. In addition, the resource is removed from the managed resources store 70. In one embodiment, the "line unmanaged" notification to the remote stations 16 is in the form of a Simple Network Management Protocol (SNMP) trap.

However, if the resource was not taken out of service intentionally, as indicated by the module availability 34, port availability 50 and subscriber availability 60 all being unlocked, the resource management station 14 sends a "line down" notification to each of the remote stations 16 in the remote station list 92 or, in the alternative embodiment, to each of the specified remote stations 16. In addition, the status associated with that resource is updated to not trained. In one embodiment, the "line down" notification to the remote stations 16 is in the form of an SNMP trap.

If the status has not changed from one poll to the next, additional processing is provided to determine whether the resource changed its status during the interval between polls, but returned to its original status before the second poll. If the previous status was either training or not trained and it has not changed to trained, the resource was previously down and is still down. Because a "line down" notification has already been communicated to the appropriate remote stations 16 for this resource, no further action is necessary.

However, if the previous status was trained and the current status is still trained, the resource may have gone down during the interval and, if so, this is communicated to the appropriate remote stations 16. The resource manager 73 determines whether this has occurred by comparing the current good trains value 56 and the current failed trains value 58 of the port 32 to the previous good trains value 80 and the previous failed trains value 82 of the resource information field 76. Any differential indicates a connection attempt, either successful or unsuccessful, which in turn indicates a disconnection prior to the attempt. Thus, intermediate status changes between consecutive polls are manifested in count differentials.

When such an intermediate status change occurs, the resource management station 14 sends a "line bounce" notification to each of the remote stations 16 in the remote station list 92 or, in the alternative embodiment, to each of the specified remote stations 16. In one embodiment, the "line bounce" notification to the remote stations 16 is in the form of an SNMP trap. In addition, the resource management station 14 sends a count of the number of intermediate status changes, which is the number of times the resource attempted to make a connection during the polling interval. The resource manager 73 determines the number of intermediate status changes by adding the difference between the counts stored in the good trains value 56 and the previous good trains value 80 to the difference between the counts stored in the failed trains value 58 and the previous failed trains value 82, taking into account any rollover of the counters.

According to the embodiment described above, a reduction in bandwidth is achieved because the resource management station 14 retrieves information regarding the number of good and failed trains only when the current status is trained. In an alternative embodiment, however, the resource manager 73 determines the number of intermediate status changes regardless of the current status as compared to the previous status. Thus, after every poll, the resource manager 73 compares counts to identify differentials for every managed resource. The number of intermediate status changes is then communicated to the appropriate remote stations 16. In another embodiment, each managed resource may be assigned a code that instructs the resource manager 73 to determine the number of intermediate status changes for that particular resource in the event that a specified combination or combinations of current status and previous status are found in consecutive polls.

FIG. 2 is a flow diagram illustrating a method for managing resources in a telecommunications network in accordance with the present invention. The embodiment described in connection with FIG. 2 includes modems as managed resources. It will be understood, however, that other suitable resources may be managed by the present invention in the same manner.

The method begins at step 200 where the polling engine 72 retrieves the polling interval 90. At step 202, the polling engine 72 retrieves the remote station list 92. At step 204, the resource management station 14 retrieves the network element list 74. At step 206, the first network element 12 is selected from the list 74.

After the port list 25 is retrieved from the selected network element 12 in step 208, the resource management station 14 determines whether there are more ports 32 to check in decisional step 210. If there are more ports 32, the method follows the Yes branch from decisional step 210 to step 212 where the resource management station 14 retrieves the next port 32 from the list 25. At decisional step 214, the resource management station 14 determines whether the current port 32 is being managed. If the port 32 is managed, the method follows the Yes branch from decisional step 214 to decisional step 216 where the resource management station 14 determines whether the status of the port 32 has changed.

If the status has changed, the method follows the Yes branch from decisional step 216 to decisional step 218 where the resource management station 14 determines whether the current status 52 is trained. If the current status 52 is trained, the method follows the Yes branch from decisional step 218 to step 220 where the resource management station 14 sends a "line up" notification to the appropriate remote stations 16. In one embodiment, the "line up" notification to the remote stations 16 is in the form of an SNMP trap.

At step 222, the resource management station 14 stores the status 78, number of good trains 80, and number of failed trains 82 for the current port 32 for use in the next poll. The method then returns to decisional step 210 where the resource management station 14 determines whether there are more ports 32 to check.

Returning to decisional step 218, if the port 32 was not determined to have a current status 52 of trained, the method follows the No branch to decisional step 226 where the resource management station 14 determines whether the port availability 50 is locked. If the port availability 50 is locked, the method follows the Yes branch from decisional step 226 to step 228 where the resource management station 14 sends a "line unmanaged" notification to the appropriate remote stations 16. At step 230, the resource management station 14 removes the resource information field 76 for the port 32 from the managed resources store 70 and returns to decisional step 210.

Returning to decisional step 226, if the port availability 50 is unlocked, the method follows the No branch to step 232 where the resource management station 14 sends a "line down" notification to the appropriate remote stations 16. At step 234, the resource management station 14 stores the status 78 for the port 32 for use in the next poll before returning to decisional step 210.

Returning to decisional step 216, if the current status 52 of the port 32 has not changed, the method follows the No branch to decisional step 236 where the resource management station 14 determines whether the port 32 is up, as indicated by a previously recorded status 78 of trained. If the port 32 is up, the method follows the Yes branch from decisional step 236 to decisional step 238 where the resource manager 73 determines whether the number of good trains or the number of failed trains has changed during the polling interval. As described in more detail above, this determination is made by comparing the current numbers to the previous numbers to find any differential that indicates an intermediate status change has occurred.

If there has been a change, the method follows the Yes branch from decisional step 238 to step 240 where the resource management station 14 sends a "line bounce" notification to the appropriate remote stations 16 indicating that, although the port 32 was determined to be up in consecutive polls, the port 32 went down at some point during the interval 90 between polls. The resource management station 14 may also send the number of intermediate status changes that occurred between consecutive polls. As described in more detail above, this number is determined by adding the differences in the counts of good and failed trains from one poll to the next. At step 242, the resource management station 14 stores the status 78, number of good trains 80, and number of failed trains 82 for the port 32 for use in the next poll before returning to decisional step 210.

Returning to decisional step 238, if there has been no change in the numbers of good trains or failed trains, then no intermediate status changes have occurred and the method follows the No branch to step 244 where the resource management station 14 stores the status 78 for the port 32 for use in the next poll before returning to decisional step 210.

Returning to decisional step 236, if the port 32 was not up, the method follows the No branch to step 244 where the resource management station 14 stores the status of the port 32 before returning to decisional step 210.

Returning to decisional step 214, if the port 32 was not being managed, the method follows the No branch to decisional step 246 where the resource management station 14 determines whether the subscriber record 26 has been assigned an identifier. If the subscriber record 26 has an identifier, the method follows the Yes branch to decisional step 248 where the resource management station 14 determines whether all the resources are unlocked by checking the module availability 34, port availability 50 and subscriber availability 60. If the resources are unlocked, the method follows the Yes branch to step 250 where a resource information field 76 for the port 32 is added to the managed resources store 70 of the resource management station 14 before continuing to decisional step 218.

Returning to decisional step 246, if the subscriber record 26 has not been assigned an identifier, the method follows the No branch and returns to decisional step 210. Similarly, if any of the resources are determined to be locked in decisional step 248, the method follows the No branch and returns to decisional step 210.

Returning to decisional step 210, when the resource management station 14 determines that there are no more ports 32 to check, the method follows the No branch to decisional step 252 where the resource management station 14 determines whether there are more network elements 12 in the list 74. If there are more network elements 12 in the list 74, the method follows the Yes branch from decisional step 252 to step 254 where the next network element 12 is retrieved from the list 74 and the method returns to step 208. In this way, each specified resource of each identified network element 12 is checked.

Returning to decisional step 252, if there are no network elements 12 remaining on the network element list 74, the method follows the No branch to step 256 where the resource management station 14 is put into a sleep mode for a specified amount of time corresponding to the polling interval 90 as stored in the polling engine 72. After the polling interval 90 has passed, the entire process is repeated beginning with step 206.

Although the present invention has been described with several embodiments, various changes and modifications may be suggested to one skilled in the art. It is intended that the present invention encompass such changes and modifications as fall within the scope of the appended claims.

What is claimed is:

1. A resource management station for a distributed system, comprising:
    a managed resources store operable to store for each of a plurality of remote managed resources a previous value of a status of the remote managed resource and a previous value of a parameter indicative of status changes by the remote managed resource;
    a polling engine operable to periodically poll each remote managed resource for a current value of the status and current value of the parameter; and
    a resource manager operable to determine whether a status change occurred in the remote managed resource by comparing the previous and current values of the status and to determine whether an intermediate status change occurred by comparing the previous and current values of the parameter.

2. The resource management station of claim 1, wherein the resource manager is further operable to determine a number of intermediate status changes.

3. The resource management station of claim 1, wherein the resource management station is further operable to communicate the occurrence of the intermediate status change to a plurality of remote stations.

4. The resource management station of claim 1, wherein the remote managed resources comprise modems and the parameter comprises a number of good trains for the modem and a number of failed trains for the modem.

5. The resource management station of claim 1, wherein the parameter comprises a counter incremented in response to an event indicative of a status change.

6. The resource management station of claim 1, wherein the remote managed resources comprise dedicated modems.

7. A computerized system for managing remote resources in a telecommunications system, comprising:
    a computer-readable medium; and
    a computer program encoded on the computer readable medium, the computer program operable to store for each of a plurality of remote managed resources a previous value of a status of the remote managed resource and a previous value of a parameter indicative of status changes by the remote managed resource, to periodically poll each remote managed resource for a current value of the status and current value of the parameter, to determine whether a status change occurred by comparing the previous and current values of the status, and to determine whether an intermediate status change occurred by comparing the previous and current values of the parameter.

8. The computerized system of claim 7, the computer program further operable to determine a number of intermediate status changes.

9. The computerized system of claim 7, the computer program further operable to communicate the occurrence of the intermediate status change to a plurality of remote stations.

10. The computerized system of claim 7, wherein the remote managed resources comprise modems and the parameter comprises a number of good trains for the modem and a number of failed trains for the modem.

11. The computerized system of claim 7, wherein the parameter comprises a counter incremented in response to an event indicative of a status change.

12. The computerized system of claim 7, wherein the remote managed resources comprise dedicated modems.

13. A method for managing resources, comprising:
    storing a previous value of a status of a remote managed resource and a previous value of a parameter indicative of status changes by the remote managed resource;
    polling the managed resource to obtain a current value of the status and a current value of the parameter;
    determining whether a status change occurred by comparing the current and previous values of the status; and
    determining whether an intermediate status change occurred by comparing the current and previous values of the parameter.

14. The method of claim 13, further comprising, in response to determining no status change occurred, determining whether the intermediate status change occurred.

15. The method of claim 13, wherein the remote managed resource comprises a modem and the parameter comprises a number of good trains for the modem and a number of failed trains for the modem.

16. The method of claim 15, the act of comparing the current and previous values of the parameter comprising:
    comparing the previous number of good trains to the current number of good trains; and comparing the previous number of failed trains to the current number of failed trains.

17. The method of claim further comprising determining a number of intermediate status changes.

18. The method of claim 17, wherein the remote managed resource comprises a modem and the parameter comprises a number of good trains and a number of failed trains, the act of determining the number of intermediate status changes comprising:

determining an intermediate number of good trains based on a difference between a previous and a current number of good trains;

determining an intermediate number of failed trains based on a difference between a previous and a current number of failed trains; and summing the intermediate number of good and failed trains.

19. The method of claim 17, further comprising communicating to a remote station the number of intermediate status changes.

20. The method of claim 13, wherein the parameter comprises a counter incremented in response to an event indicative of a status change.

* * * * *